United States Patent
Fitt et al.

(10) Patent No.: US 6,368,443 B1
(45) Date of Patent: *Apr. 9, 2002

(54) STARCH-HEMICELLULOSE ADHESIVE FOR HIGH SPEED CORRUGATING

(75) Inventors: Larry E. Fitt, Orland Park; James J. Pienkowski, Oak Forest; Jack R. Wallace, Bolingbrook, all of IL (US)

(73) Assignee: Corn Products International, Inc., Bedford Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/209,507

(22) Filed: Mar. 9, 1994

Related U.S. Application Data

(63) Continuation-in-part of application No. 08/010,247, filed on Jan. 28, 1993, now Pat. No. 5,358,559.

(51) Int. Cl.$^7$ .................................................. B31F 1/22
(52) U.S. Cl. ..................... 156/205; 106/215.5; 156/328; 156/336
(58) Field of Search ................................. 156/336, 328, 156/205; 106/203, 213

(56) References Cited

U.S. PATENT DOCUMENTS 2,772,981 A * 12/1956 Smart ......................... 106/203
4,941,922 A * 7/1990 Snyder ........................ 156/214
4,994,115 A   2/1991 Giesfeldt et al. .............. 127/67
5,073,201 A  12/1991 Giesfeldt ..................... 127/67
5,093,393 A * 3/1992 Faber et al. ................. 156/328

FOREIGN PATENT DOCUMENTS

GB            618584      * 2/1949 ................. 106/203

OTHER PUBLICATIONS

R. G. Whistler et al., Starch: Chemistry and Technology, 2nd edition, chapter xx, pp. 596–607, Academic Press, Inc., New York, 1984.

* cited by examiner

Primary Examiner—John J. Gallagher
(74) Attorney, Agent, or Firm—Norris, McLaughlin & Marcus

(57) ABSTRACT

Starch-based corrugating adhesives of the carrier, no-carrier and carrier-no-carrier type having improved green strength and water resistance are prepared by adding hemicellulose to the adhesive composition. When the adhesive is the carrier type or the carrier-no-carrier type, the hemicellulose can be extracted from corn fiber in situ during the process of preparing the carrier phase.

10 Claims, No Drawings

STARCH-HEMICELLULOSE ADHESIVE FOR HIGH SPEED CORRUGATING

CROSS-REFERENCE TO RELATED APPLICATION

This is a continuation-in-part of application Ser. No. 08/010,247, filed Jan. 28, 1993 and issued as U.S. Pat. No. 5,358,559 on Oct. 25, 1994.

BACKGROUND OF THE INVENTION

1. Field of the Invention

The present invention relates to starch-based corrugating adhesives which contain hemicellulose. More particularly, the invention relates to high speed corrugating adhesives of the carrier, no-carrier or carrier-no-carrier type which are prepared by incorporating hemicellulose in the adhesive formulation to obtain improved green strength and water resistance.

2. Description of Related Art

Adhesives used in manufacturing corrugated board are usually comprised of starch, caustic, a boron containing compound and, where water resistance is needed, a waterproofing resin. The main binder of corrugating paper is the starch which is gelatinized in the corrugating process as it penetrates the paper fiber. The other components, namely, the caustic, boron containing compound, and waterproofing resin are auxiliary agents which modify the basic properties of the starch.

Caustic, usually in the form of sodium hydroxide, directly affects the gelatinization point temperature of the starch. Gelatinization point temperature is often referred to as gel point or gel temperature and is reduced from its natural value of 165° F. (74° C.) for unmodified corn starch to a temperature in the range from about 138° F. (59° C.) to about 152° F. (67° C.) by the addition of caustic. Caustic also enhances penetration of the gelatinized starch into the surface paper fibers allowing for better bonding.

The boron containing compounds perform multiple tasks. The most important function is developing the adhesive tackiness that is crucial in the formation of the "green bond". The green bond is the bond which holds the components of the corrugated board together until final heat curing of the adhesive system. It relies solely on the viscosity of the adhesive to maintain the integrity of the product during curing. Corrugating machine speeds therefore are limited by the rate of viscosity increase (i.e., rate of green bond formation) in the bond line between the liner and the corrugated medium. The oxygen atoms attached to the boron form stronger bonds, sometimes called boron bridges, between the starch and cellulose hydroxyl groups. Boron containing compounds also act as buffering agents in the presence of caustic and help maintain the viscosity stability of the adhesive paste.

It is known that polyhydroxy compounds other than starch, such as polyvinyl alcohol, will respond with the boron containing compounds in a manner similar to that with starch. Boron containing compounds and polyvinyl alcohol are believed to interact synergistically to form strong bonds. Like other polyhydroxy compounds, polyvinyl alcohol in the presence of starch will develop adhesive tackiness faster in the presence of boron, which means that the corrugator can operate at higher machine speeds.

Water proof or water resistant resins are considered to be an optional component of adhesives, and although some corrugating plants may not need them, most plants are prepared to use them when needed. Many types of thermosetting resins are suitable. The most common of them are derived from urea-formaldehyde, ketone-formaldehyde or melamine-formaldehyde. When heat and pressure is applied to them in a corrugating machine, they will condense to form an excellent water resistant network. When polyvinyl alcohol is added to adhesives containing these resins, it participates in cross-linking which will improve the water resistant bonds.

In the corrugating process, adhesive is commonly applied to the tips of the flutes of a corrugated medium. Then a noncorrugated flat paper liner is applied against the adhesive coated flutes as they pass between a corrugating roll and a pressure roll. The resulting product has the corrugating medium on one side and a flat liner on the other side and is called a single-faced portion. The single-faced portion may be used "as is" (called a "single facer" board) or adhesive may be applied to the flute tips of the single-faced portion and a second flat sheet can be applied in the same manner as the first in what is called a "double-facer" or a "double-backer" operation. The second liner sheet is treated with heat and reduced pressure (relative to the pressure used to make a single-faced portion) immediately following contact with the adhesive.

Starch-based adhesives which can be of the carrier, no-carrier and carrier-no-carrier type are commonly used in processes for manufacturing corrugated paper board. In carrier type adhesives, a portion of the starch (or dextrin) forms a carrier, often known as the gelatinized phase, which suspends the balance of the starch which is in an ungelatinized state. Under conditions of heat and pressure, the ungelatinized starch is rapidly hydrated and gelatinized to increase quickly the viscosity and adhesivity of the adhesive composition. In no-carrier type adhesives, all of the starch is slightly cooked or swollen with heat and caustic soda for viscosity. Finally, carrier-no-carrier type adhesives have a portion of the starch which forms a carrier and is responsible for about one half of the viscosity and the remaining viscosity is obtained by slightly swelling the uncooked starch.

One of the most important properties of a corrugating adhesive is green strength. Green strength is the characteristic that holds the paper together until the full strength of an adhesive develops. The green strength contributed by conventional starch adhesives is fairly low, but the addition of substances like polyvinyl alcohol improve the property as noted above. Increased levels of green strength, sometimes called early tack, allow corrugating machine operators to increase the speed of their machines without sacrificing the quality of the product.

Synthetic polymers that affect green strength tend to be expensive and their prices follow the volatility of the petroleum market. These polymers also are perceived by the public as less desirable than natural products. Moreover, the use of such polymers can require additional processing steps which adds expense for the corrugator.

According to U.S. Pat. No. 4,941,922, fibers can be added to starch-based corrugating adhesives to enhance adhesion and dispersion and yield improved adhesive characteristics including increased waterproofness, dry strength, viscosity and adhesiveness. Suitable sources of fiber are described as cellulosic fiber including wood, paper, cotton and rayon; fibers of synthetic origin including Nylon, polyester, polypropylene, Lycra Spandex, Vyrene, Vinyon, Dynel, Saran, Creslan, Acrylic, polyethylene, Teflon, tetrafluoroethylene, glass, Corlon and metallic fibers. Fibers generated during the wheat or corn milling processes are also said to be suitable. According to the patent, the fibers typically are suspended initially in the uncooked starch portion, suspended with the carrier portion, suspended prior to the carrier-no-carrier (or no-carrier) swell or added to the final adhesive mixture prior to storage or use. There is no experimental data in the patent, however, describing the use of fibers generated during the corn milling process and the patent does not disclose the extraction of hemicellulose from fibers of any kind. Furthermore, the fibers must be present in an amount from about 2.2 to about 22 pounds of fiber per 100 pounds of corrugating adhesive and have a diameter of between about 0.0005 inches and about 0.02 inches and a length of between about 0.025 inches and about 0.25 inches.

It has now been found that hemicellulose, a natural and readily available component of corn kernels, hulls and other plant materials, can be used to enhance green strength in starch-based corrugating adhesives. Hemicellulose is a pentoglycan which can exist in various forms depending upon the plant source.

It has also now been found that hemicellulose can be extracted in situ from corn fiber during the cooking phase in the manufacture of carrier type and carrier-no-carrier type corrugating adhesives. Corn fiber produced by the corn wet milling industry and having a particle size in the adhesive, or in a carrier phase, of less than about 0.005 inch is preferred.

In the present specification and claims, all parts and percentages are by weight unless otherwise specified, and the term "parts of adhesive" is used to refer to the total weight of adhesive, including water, starch and all chemicals. The term "parts of carrier phase" is used to refer to the total weight of the carrier phase, including water, starch and all chemicals. The terms "total starch" and "total carbohydrate" refer to the total cumulative weight of unmodified starch, modified starch and dextrin present, i.e. all of the carbohydrates.

SUMMARY OF THE INVENTION

The corrugating adhesive composition of the invention is a carrier, no-carrier or carrier-no-carrier type, starch-based corrugating adhesive which contains from about 0.1% to about 20.0%, preferably from about 0.3% to about 10.0%, hemicellulose by weight based on total starch. The hemicellulose can be derived from various plant materials including wood and agricultural products, and a preferred source of hemicellulose is corn. Hemicellulose also can be slightly hydrolyzed to improve viscosity. A partially hydrolyzed hemicellulose is available under the trade designation CELLACE from NSK, Tokyo, Japan.

Hemicellulose can be added to the primary or secondary mixer in the preparation of a carrier type corrugating adhesive or it can be added at any stage in the preparation of a no-carrier or a carrier-no-carrier type adhesive. In the preferred embodiment, hemicellulose is extracted in situ from corn fiber which has been added to the primary mixer in the preparation of a carrier type or carrier-no-carrier type corrugating adhesive.

According to the preferred embodiment, the carrier type corrugating adhesive of the invention is made by the following process:

1. Water, unmodified starch, and/or modified starch and/or dextrin, and corn fiber are mixed in a primary mixer and heated for at least about 1 minute and preferably from about 1 minute to about 25 minutes at a temperature of from about 115° F. (46° C.) to about 180° F. (82° C.);

2. An aqueous solution of caustic is added to attain a pH from about 10 to about 14, preferably from about 12 to about 14, and mixing is continued for at least about 10 minutes and preferably from about 10 to about 40 minutes;

3. Additional water is added and mixing is continued for at least about 1 minute and preferably from about 1 to about 15 minutes, most preferably from about 5 to about 8 minutes, to make a carrier phase;

4. A secondary mixer is charged with water, heated to from about 70° F. (21° C.) to about 105° F. (41° C.), preferably from about 90° F. (32° C.) to about 100° F. (38° C.) and borax is added;

5. Unmodified starch and/or modified starch and/or dextrin is added, and waterproof resin can be added as an option, to make a suspended phase (also called a suspended starch phase) and the contents are mixed for from about 3 to 25 minutes;

6. The contents of the primary mixer are gradually added to the secondary mixer with continuous mixing. This step typically is carried out over a period of about 5 to 20 minutes.

The corn fiber which is added to the primary mixer can be any kind of corn fiber. Suitable fibers include crude fiber, typically described as feed, and more finished products such as dietary corn fiber which is made for human consumption. Crude fiber or feed generally contains from about 20% to about 40% hemicellulose and dietary corn fiber generally contains from about 50% to about 80% hemicellulose. When dietary corn fiber is employed, the amount used is preferably from about 0.1 to about 5.0 parts per 100 parts of adhesive. The fiber in the adhesive, or in a carrier phase, preferably has a particle size of less than about 0.005 inch, a geometric mean size of less than about 0.00005 inch and a median size of less than about 0.00005 inch.

DETAILED DESCRIPTION OF THE INVENTION

The corrugating adhesive of the invention is an aqueous emulsion which comprises water; from about 0.1 to about 20.0%, preferably from about 0.3% to about 10.0%, hemicellulose by weight based on total starch; from about 10 to about 35, preferably from about 18 to about 32, parts per 100 parts of adhesive of a carbohydrate component which is defined herein as comprising unmodified starch and/or modified starch and/or dextrin; and sufficient caustic to attain a pH from about 10 to about 14, preferably from about 12 to about 14.

In the carrier type embodiment, the carrier phase comprises from about 2 to about 6 parts per 100 parts of adhesive of the carbohydrate component and the remaining carbohydrate component is in a suspended phase. When the adhesive is a no-carrier type adhesive, the carbohydrate component is partially swollen to attain a viscosity from about 20 to about 40 seconds, preferably from about 25 to about 35 seconds, as determined by an orifice type viscometer, commonly known as a Stein Hall cup. Finally, in the carrier-no-carrier type embodiment from about 0.05 to about 0.10 parts of the carbohydrate component (based on total starch) is in a carrier phase and the remainder is partially swollen to attain a viscosity from about 30 to about 50 seconds, preferably from about 35 to about 45 seconds, determined in the same manner as for the no-carrier embodiment.

The adhesive of the invention can contain from about 0.2 to about 1 part per 100 parts of adhesive of a boron containing compound. A waterproofing or water resistant resin also can be incorporated in the adhesive in an amount from about 0.5 to about 5 parts per 100 parts of adhesive.

In a preferred embodiment, the adhesive is a carrier type or carrier-no-carrier type adhesive and the hemicellulose is extracted from corn fiber in situ during preparation of the carrier phase.

The carrier type corrugating adhesive composition of the invention is made by separately preparing two intermediates and then combining them. One intermediate is called the carrier phase and the other is called the suspended starch phase.

The carrier phase is made by admixing the hemicellulose and the carbohydrate component with water. These components can be added to the water together or in any order. The amount of hemicellulose which is added is from about 0.4 to about 80 parts, preferably from about 1.2 to about 40 parts, per 100 parts of carrier phase or from about 0.1 to about 20.0 parts per 100 parts of total starch in the adhesive. The carbohydrate component is added in an amount from about 10 to about 25 parts per 100 parts of carrier phase or from about 2 to about 6 parts per 100 parts of adhesive.

In a preferred embodiment of the invention, the hemicellulose from corn fiber is employed in a carrier type adhesive. The preferred corn fiber is dietary corn fiber containing from about 50 to about 80% hemicellulose and it can be prepared according to U.S. Pat. Nos. 4,994,115 or 5,073,201. The corn fiber containing hemicellulose is admixed with the other ingredients in the preparation of the carrier phase. The components are continuously mixed and heated to a temperature from about 115° F. (46° C.) to about 180° F. (82° C.). Sufficient caustic is then added to provide an alkaline pH while continuing mixing and maintaining heating. If the hemicellulose is added in the form of corn fiber, mixing and heating are continued for a sufficient time to extract hemicellulose in situ from the corn fiber. The pH should exceed about 10 and preferably will exceed about 12. The sufficient time and temperature will generally be from about 10 to about 40 minutes at from about 115° F. (46° C.) to about 180° F. (82° C.). Lower temperatures generally correspond with longer times.

The preferred fiber of the present invention has a particle size in the adhesive of less than about 0.005 inch, a geometric mean size of less than about 0.00005 inch and a median size of less than about 0.00005 inch.

Following the removal of heat, mixing can be continued to allow uniform cooling. Water can be added at this stage to speed cooling.

The suspended starch phase is made by admixing the carbohydrate component with heated water. The water is heated at a temperature from about 70° F. (21° C.) to about 105° F. (41° C.) and is mixed continuously. The carbohydrate component is added in an amount from about 10 to about 25 parts per 100 parts of the corrugating adhesive, and preferably in an amount from about 17 to about 20 parts per 100 parts of the adhesive.

A boron containing compound such as boric acid or a boric acid salt must be added at some stage in the process to improve tack or stickiness. It may be added in the preparation of the carrier phase, the suspended starch phase, or in both phases. When a portion of the boron containing compound is added during the preparation of the carrier phase, it also improves the viscosity stability of the final adhesive product. Preferably, however, most of the boron containing compound is added to the suspended starch phase.

When the boron containing compound is added during the preparation of the carrier phase, it is added in an amount from about 0.03 to about 1 part per 100 parts of carrier phase or in an amount from about 0.01 to about 0.3 parts per 100 parts of adhesive. The boron containing compound added to the suspended starch phase is added in an amount to bring the total boron containing compound up to from about 0.2 to about 1 part per 100 parts of the adhesive.

The carrier phase is gradually added to a tank containing the suspended starch phase with continuous mixing of the contents of the tank. The temperature of the tank contents is maintained at from about 70° F. (21° C.) to about 105° F. (41° C.) during the gradual addition. The amount of carrier phase added is from about 15 to about 50 parts per 100 parts of adhesive.

A waterproofing or water resistant resin may be added to the suspended starch phase tank at any time in an amount from about 0.5 to about 5 parts per 100 parts of adhesive. It is preferable to add the resin following completion of all of the other adhesive preparation steps.

The individual components of the carrier type adhesive composition of the invention are described in detail below along with descriptions of their preferred embodiments.

Hemicellulose

Hemicellulose is a natural polymer present in many living plants and it can be derived from various sources for use according to the invention. Its name is derived from its close association with cellulose in the plant tissue and once it was thought to be a precursor to cellulose synthesis. It is a relatively strong material that resists breakdown through mechanical shearing and the subsequent loss of viscosity. It is completely compatible with starch and reacts positively with boron compounds to yield boron-oxygen bridged structures common to polyhydroxy compounds in corrugating adhesives. Hemicellulose can be partially hydrolyzed if desired to reduce its molecular weight and enhance its viscosity characteristics.

It is possible to extract hemicellulose from corn fiber using an alkaline medium such as calcium hydroxide solution or dilute alkali. However, this step can be eliminated in preparing corrugating adhesives because they are prepared in an alkaline medium. Therefore the hemicellulose can be extracted in situ without the need for a prior extraction-purification step.

Hemicellulose is based on a 5-member xylan (pentosans) structure having additional side chains such as arabano-xylan and glucuronic acid. The skeleton configuration is beta, 1, 4 linkages similar to those found in cellulose. Although its molecular structure is different from starch and cellulose, the key to its similarity is the many functional hydroxyl groups available for bonding. The structure for hemicellulose can vary substantially, but a generalized form of the structure is illustrated below:

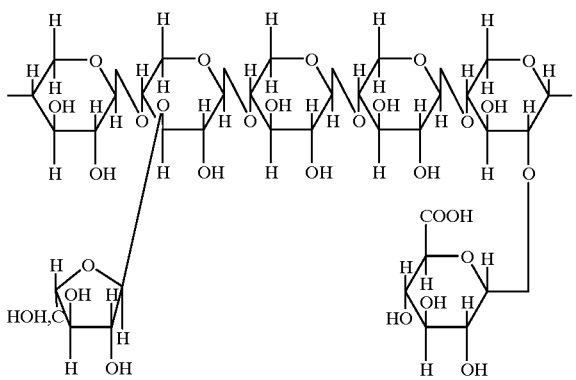

The pericarp or hull of a corn kernel is a particularly good source of hemicellulose because it is high in hemicellulose content, the hemicellulose is readily extracted from it and it is abundantly available. One of the largest, potential, uncontaminated (i.e., not detrimental to the corrugating process) sources of hemicellulose is corn fiber produced by the corn wet milling industry. A preferred type of corn fiber is dietary corn fiber which is sold under the designation PEERLESS® corn fiber by the Corn Products Unit of CPC International Inc., P. O. Box 8000, Englewood Cliffs, N.J. 07632 USA.

Hemicellulose responds favorably to the addition of boron compounds. The boron bridging mechanism that is common to polyhydroxyl compounds, seems to be another positive attribute of the hemicellulose in starch-based corrugating adhesives.

Carrier Phase Starch or Dextrin

While unmodified starch or dextrin can be used to make the carrier phase of the present invention, modified starch is preferred because it enables the dissolution of substantially more solids (up to twice the amount attainable with unmodified starch) in the adhesive composition and therefore contributes to the development of better green bonding and adhesive characteristics. The reason is that modified starches, when pasted in water, are less viscous than their unmodified counterparts, and as a consequence they can "carry" more ungelatinized starch at practical viscosities.

The modified starch which is used in accordance with the present invention can be mechanically, chemically or heat modified. Compared to unmodified starches, modified starches frequently possess superior physical properties such as increased solubility, better film forming, increased whiteness, improved gel strength, viscosity stability, increased adhesivity, improved resistance to shear and increased resistance to freeze-thaw degradation. Starches derived from other genetic forms of corn, such as high amylose and waxy corn as well as sorghum varieties would also be suitable for such applications. Suitable chemically modified starches include modified oxidized starch such as hypochlorite-oxidized starch, acid-thinned starch, ethylated starch, cross-bonded starch and others which have reduced molecular weight, higher fluidity and/or functional sub groups.

Examples of chemically modified starches which can be used in the invention and are commercially available are SUREBOND® or STABLEBOND® modified starches which have residual carboxyl functionality and extreme uniformity and are sold by the Corn Products Unit of CPC International Inc., P. O. Box 8000, Englewood Cliffs, N.J. 07632 USA.

Unmodified starches which can be used in the carrier phase are the same as those described in more detail below in the discussion of the suspension phase starch.

The dextrins which can be used in the carrier phase are prepared by heating starch under various conditions as more fully described in Whistler, R. L. et al., Starch: Chemistry and Technology, 2nd edition, chapter xx, pages 596–607, Academic Press, Inc. (New York, 1984).

Suspension Phase Starch

The unmodified starch used in the suspension phase is a commodity chemical produced from the root, stem or fruit from a number of plants. It is a high molecular weight carbohydrate polymer which is comprised of linear and branched polysaccharide polymers. Modified starch and/or dextrin can be used as the suspension phase starch, but unmodified starch is more economical.

Boron Containing Compound

Any boron containing compound having free hydroxyl groups attached to the boron atoms can be used. The most commonly used compounds are commercial boric acid (ortho boric acid, $H_3BO_3$ and its hydrated forms $H_3BO_3.xH_2O$) and borax (sodium tetraborate decahydrate, $Na_2B_4O_7.10H_2O$ and other hydrate and anhydrous forms).

Caustic

Any strong base can be used, but the preferred bases are alkali metal hydroxides. The most preferred are sodium and potassium hydroxides.

Waterproofing/Water Resistance

Starch-based corrugating adhesives prepared with hemicellulose have excellent waterproof characteristics compared with the same adhesive made without hemicellulose. If more enhanced waterproofing or water resistance is desired, however, conventional resins which are employed in the corrugating industry can be used.

Preferred waterproofing or water resistant resins include those which upon heating in basic media generate cross-linking species which react and cross-link with any available hydroxyl group in the starch, polyvinyl alcohol, hemicellulose or cellulose molecules. The cross-linking action reduces the hydrophilic nature and water-solubility of the starch, hemicellulose, and other polyhydroxy molecules by effectively removing the availability of hydroxyl groups to water and by developing hydrophobic, aliphatic cross-linking moieties. Condensation products from the reaction of a ketone and an aldehyde compound are suitable. These resins are characterized as polyether polymers, but can contain a variety of other monomers such as urea, melamine, and the like. The most preferred resins are acetone-formaldehyde resins, acetone-urea-formaldehyde resins and acetone-melamine-formaldehyde resins comprising about 1.5–30% by weight acetone, about 5–50% by weight formaldehyde and about 0–15% of a third monomer. A commercially available cross-linking resin which is suitable for use in the present invention is the ASTROMEL® series of resins manufactured by Astro Industries, Inc., 114 Industrial Boulevard, P. O. Box 2559, Morganton, N.C. 28655 USA.

EXAMPLES

Carrier Type Adhesives

Corrugated board samples were made using a conventional corrugating machine. A starch adhesive was made with a standard Stein-Hall system manufactured by the Ringwood Company, Chicago, Ill., USA, consisting of a 250 gallon primary mixer and a 666 gallon secondary mixer. The adhesives were prepared using single viscosity formulas. PEERLESS® G311 fiber was added to the adhesive and the water in the secondary mixer was increased to keep the batch viscosity within a workable range. There were no radical differences either in the adhesive preparation or the machine performance when fiber was added. The most noticeable difference was the color of the adhesive. Fiber imparted a dark brown color that looked like "pumpkin pie filling" as compared to the usual cream color of the adhesive.

The adhesives prepared were made with hemicellulose/fiber and starches from three groups:

1. Unmodified pearl starch that has a low fluidity (alkali fluidity approximately 1).
2. Modified carrier starch STABLEBOND® G551 having an alkali fluidity of approximately 10.
3. Modified carrier starch SUREBOND® G550 having an alkali fluidity of approximately 30.

Alkali fluidity is a measure of starch-paste flowability in an alkaline medium. Therefore, the higher the alkali fluidity the greater the flowability of the starch-paste, or the thinner its consistency. That property allows the corrugator to add more starch or solids to the adhesive, which in turn means there will be better interaction with the paper fibers and other adhesive additives. The procedure for measuring alkali fluidity was as follows:

Weigh 5.00 grams of sample, transfer to a 300 milliliter glass beaker, add 10.0 milliliters of water at 25° C. and stir to a slurry with a glass rod. Place the beaker in a water bath at 25° C., add 90.0 milliliters of 1% (weight/volume) sodium hydroxide at 25° C. and start a stopwatch. Stir for 3 minutes at 200 rpm and let stand in the bath for a total of 32.5 minutes.

Rinse a fluidity funnel with 25° C. water and drain thoroughly. Place a finger under the tip of the funnel and pour the volume of prepared paste into the funnel while avoiding the introduction of air bubbles. Place a 100 milliliter graduated cylinder under the tip. At 33 minutes total elapsed time after the sodium hydroxide was added, remove the finger blocking the funnel tip and allow paste to flow into the cylinder for exactly 70 seconds and quickly remove the cylinder. Disperse any foam with a drop of amyl alcohol.

The alkali fluidity is the number of milliliters of paste collected in the cylinder per 70 seconds, corrected according to the starch calibration curve furnished with the funnel.

Laboratory adhesives with added hemicellulose indicated strong corrugated bonding. Testing on a corrugating machine showed improved water resistance of corrugated board when hemicellulose rich corn fiber (PEERLESS® G311) was used. Higher green bond strength was observed which enabled the corrugating machine to operate at higher speeds without any loss of board quality.

Example 1

Unmodified Starch Adhesives

Fiber added to adhesives using all Pearl starch were prepared with and without corn fiber as set forth in Table 1. PEERLESS® G311 corn fiber was used in Formula 2. Waterproof resins were not used.

TABLE 1

Single Viscosity Formulas for Unmodified Starch

| Formula No. | 1 | 2 |
|---|---|---|
| % Fiber | 0 | 5 |
| Primary Mixer | | |
| Water, gal. | 100 | 100 |
| Pearl Starch, lbs. (Code 3005) | 175 | 175 |
| Fiber, lbs. | 0 | 70 |
| Mix, min. | 3 | 3 |
| Heat, ° F. | 140 | 140 |
| Caustic, lbs. | 36 | 36 |

TABLE 1-continued

Single Viscosity Formulas for Unmodified Starch

| Formula No. | 1 | 2 |
|---|---|---|
| (diluted in 10 gal. water) | | |
| Mix, min. | 15 | 15 |
| Water, gal. | 60 | 60 |
| Mix, min. | 5 | 5 |
| Secondary Mixer | | |
| Water, gal. | 400 | 430 |
| Heat, ° F. | 90 | 90 |
| Borax(10 mol), lbs. | 31 | 31 |
| Pearl Starch, lbs. | 1225 | 1225 |
| Viscosity, sec. | 55 | 72 |
| Gel Temperature, ° F. | 149 | 147 |
| % Solids | 21.1 | 21.1 |

Example 2

Modified Carrier Starch Adhesives

The oxidized (modified) starches STABLEBOND® G551 and SUREBOND® G550 were used to formulate adhesives with higher solids than those of Example 1. Four formulas were used with each starch as summarized in Tables 2 and 3, so that comparisons could be made between adhesives with and without fiber and waterproof resins.

TABLE 2

Single Viscosity Formulas for STABLEBOND® G551

| Formula No. | 3 | 4 | 5 | 6 |
|---|---|---|---|---|
| % Fiber | 0 | 0 | 5 | 5 |
| Waterproof Resin | No | Yes | No | Yes |
| Primary Mixer | | | | |
| Water, gal. | 100 | 100 | 100 | 100 |
| STABLEBOND® G551 | 300 | 300 | 250 | 250 |
| Fiber, lbs. | 0 | 0 | 80 | 80 |
| Mix, min. | 3 | 3 | 3 | 3 |
| Heat, ° F. | 140 | 140 | 140 | 140 |
| Caustic, lbs. | 36 | 36 | 36 | 36 |
| (diluted in 10 gal. water) | | | | |
| Mix, min. | 15 | 15 | 15 | 15 |
| Water, gal. | 60 | 60 | 60 | 60 |
| Mix, min. | 5 | 5 | 5 | 5 |
| Secondary Mixer | | | | |
| Water, gal. | 360 | 360 | 400 | 400 |
| Heat, ° F. | 94 | 94 | 94 | 94 |
| Borax(10 mol), lbs. | 31 | 31 | 31 | 31 |
| Pearl Starch, lbs. | 1400 | 1400 | 1400 | 1400 |
| Resin, lbs. | 0 | 100 | 0 | 100 |
| Viscosity, sec. | 60 | 60 | 67 | 32 |
| Gel Temperature, ° F. | 142 | 142 | 148 | 147 |
| % Solids | 25.5 | 25.6 | 24.7 | 24.7 |

The resin used in Formulas 4 and 6 for waterproofing was H. B. Fuller FulRez WB 2524. PEERLESS® G311 corn fiber was used in Formulas 5 and 6.

TABLE 3

Single Viscosity Formulas for SUREBOND® G550

| Formula No. | 7 | 8 | 9 | 10 |
|---|---|---|---|---|
| % Fiber | 0 | 0 | 5 | 5 |
| Waterproof Resin | No | Yes | No | Yes |

TABLE 3-continued

Single Viscosity Formulas for SUREBOND ® G550

| Formula No. | 7 | 8 | 9 | 10 |
|---|---|---|---|---|
| Primary Mixer | | | | |
| Water, gal. | 100 | 100 | 100 | 100 |
| SUREBOND ® G550 | 350 | 350 | 350 | 350 |
| Fiber, lbs. | 0 | 0 | 90 | 90 |
| Mix, min. | 3 | 3 | 3 | 3 |
| Heat, °F. | 140 | 140 | 140 | 140 |
| Caustic, lbs. (diluted in 10 gal. water) | 39 | 39 | 39 | 39 |
| Mix, min. | 15 | 15 | 15 | 15 |
| Water, gal. | 50 | 50 | 50 | 50 |
| Mix, min. | 5 | 5 | 5 | 5 |
| Secondary Mixer | | | | |
| Water, gal. | 380 | 380 | 465 | 465 |
| Heat, °F. | 90 | 90 | 90 | 90 |
| Borax(10 mol), lbs. | 27 | 27 | 27 | 27 |
| Pearl Starch, lbs. | 1400 | 1400 | 1400 | 1400 |
| Resin, lbs. | 0 | 100 | 0 | 100 |
| Viscosity, sec. | 66 | 44 | 61 | 44 |
| Gel Temperature, °F. | 145 | 147 | 150 | 151 |
| % Solids | 25.7 | 26.5 | 24.1 | 24.8 |

The resin used in Formulas 8 and 10 for waterproofing was EZ-ReZ 2714, available from Corrugated Chemicals, Inc., 3865 Virginia Avenue, Cincinnati, Ohio 45227. PEERLESS® G311 corn fiber was used in Formulas 9 and 10.

After the board samples were made with these adhesives, they were subjected to two Technical Association of Pulp and Paper Industry, Inc. (TAPPI) tests and one unofficial but rigorous test for waterproof integrity. Dry Pin Adhesion (TAPPI T821) for bond strength was the first test and Ply Separation (TAPPI T812) for water resistancy was the second test. (Details of the test methods are published in *TAPPI Test Methods* 1989, available from TAPPI, One Dunwoody Park, Atlanta, Ga. 30341 U.S.A.) The unofficial waterproof test boards formed with water-resistant adhesive were stored for from 3–5 days and then checked for wet strength by the following technique.

1. A sample section of the corrugated board is stamped to indicate 5 test strips.
2. Test strips are carefully sliced from the board with a sharp knife.
3. A reinforcing ¾-in strip of pressure sensitive tape is wound around the bottom of the test strip.
4. The strips are punched with punch pliers and eyelets are implanted with eyelet pliers.
5. Five points of adhesion (5 flutes) are tested over a section length of approximately ¾ inches within the middle of the test strip.
6. Test strips are cut through at the liners and flutes in such a manner that underwater loading with 250 g and 350 g weights (connected to the eyelets) affects only the five points of adhesion (5 flutes) being tested.

After 24 hours of water immersion without separation at points of adhesion: strips loaded with 250 g are classified as satisfactory; those loaded with 350 g as good.

After 36 hours of water immersion without separation at points of adhesion: strips loaded with 250 g are classified as satisfactory-plus; those loaded with 350 g as good-plus.

After 48 hours of water immersion without separation at points of adhesion: strips loaded with 250 g are classified as good; those loaded with 350 g as very good.

Those strips which separate before 24 hours of loading under water with a 250 g weight are classified as insufficiently water resistant.

Test results are summarized in Table 4.

TABLE 4

| | Dry Pin Adhesion (lbs/lineal foot) | | | Water |
|---|---|---|---|---|
| | % Paper/ Failure Single Facer | % Adhesive Failure Double Backer | Ply Separation | Proof Test (Hang Test) |
| *Comparative Board Analyses* | | | | |
| Paper Composition[1] Machine Speed (fpm)[2] Adhesive Type | | | | |
| Board 1 35-26-35 400 fpm Pearl 3005 No Fiber No Waterproof Resin | 38 10/90 | 50 20/80 | — | — |
| Board 2 42-26-33-26-42 365 fpm Pearl 3005 5% PEERLESS G311 No Waterproof Resin | 50 3/97 | 56 60/40 | — | — |
| Board 3 35-26-35 500 fpm SUREBOND G550 No Fiber No Waterproof Resin | 53 15/85 | 50 70/30 | — | — |
| Board 4 35-26-35 535 fpm SUREBOND G550 No Fiber Waterproof Resin Added | 53 5/95 | 48 15/85 | Passed | Failed |
| Board 5 33-26-33 530 fpm SUREBOND G311 5% PEERLESS G311 Waterproof Resin Added | 52 20/80 | 51 70/30 | — | — |
| Board 6 46-26-42 528 fpm SUREBOND G550 5% PEERLESS G311 Waterproof Resin Added | 58 75/25 | 50 50/50 | Passed | Passed (48 hours) |
| *Comparative Board Analyses Using Starch Adhesives Containing PEERLESS ® G311* | | | | |
| Board 10 Paper Composition Machine Speed (fpm) Adhesive Type | | | | |
| Board 7 42-33-42 500 fpm STABLEBOND G551 No Fiber No Waterproof Resin | 57 80/20 | 48 98/2 | — | — |
| Board 8 42-33-42 500 fpm STABLEBOND G551 No Fiber Waterproof Resin Added | 54 60/40 | 40 98/2 | Passed | Failed |
| Board 9 35-26-35 510 fpm STABLEBOND G551 5% PEERLESS G311 No Waterproof Resin | 50 5/95 | 54 15/85 | — | — |

TABLE 4-continued

| | Dry Pin Adhesion (lbs/lineal foot) | | | Water |
|---|---|---|---|---|
| | % Paper/ Failure Single Facer | % Adhesive Failure Double Backer | Ply Separation | Proof Test (Hang Test) |
| Board 10 35-26-35 555 fpm STABLEBOND G551 5% PEERLESS G311 Waterproof Resin Added | 43 2/98 | 57 30/70 | Passed | Failed |

[1]The paper composition is described by a series of three or five numbers. The first, third and fifth numbers represent the weight of the paper used for the liners and the second and fourth numbers represent the weight of the paper used for the flutes. For example, 42-33-42 means 42 lb. paper is used for the liners and 33 lb. paper is used for the flutes. (42 lb. paper means 1,000 square feet of the paper weighs 42 pounds.)
[2]fpm means feet per minute.

Upon surveying the results of Table 4, it became clear that the limit of the paper strength was reached. There was a high degree of paper failure when the pin adhesion results were in the 50 to 60 lbs. per lineal foot range. This range was attained whether or not the adhesive had hemicellulose. This did not reflect adversely on the use of hemicellulose because a stronger paper combination was needed to separate the bonding strength of modified starches with and without hemicellulose.

As to the waterproof tests, Board 6 made with SUREBOND G550, hemicellulose (from PEERLESS G311), and waterproof resin (CCI EZ-ReZ 2714) passed the rigorous waterproof test by lasting more than 48 hours completely submerged under water with 250 gram weights attached. This was outstanding because the test specification requires only a 24 hour holding period. It is believed that this superior waterproof bond was formed through the combined interaction of the extracted hemicellulose from the corn fiber and the other ingredients as compared to the bond formed when SUREBOND and resin were used alone. STABLEBOND G551 did not form a similar bond when used with hemicellulose and resin.

Carrier-No-Carrier Type Adhesive

A carrier-no-carrier type corrugating adhesive can be made according to the invention by the following steps:

1. About 100 pounds of starch, modified starch or dextrin (or any combination thereof) is admixed with 75 to 100 gallons of a strongly alkaline system (NaOH dissolved in water). The mixture is heated for a sufficient time to completely gelatinize the starch, modified starch or dextrin.
2. A slurry of raw starch and water (typically about 1300 to 1400 pounds raw starch in about 400 gallons of water) is prepared. Modified starch and/or dextrin can be used in addition to or instead of the raw starch to prepare the slurry.
3. The gelatinized product of step 1 is added to the slurry of step 2 with mixing.
4. The mixture of step 3 is heated under agitation with steam to about 100–102° F. to bring about controlled swelling of the raw starch (and/or modified starch and/or dextrin) granules. The gelatinized product of step 1 serves to suspend the granules during this reaction. The controlled swelling is monitored using an orifice-style viscometer. A Stein Hall viscometer, Love Cup or Zahn Cup would be suitable.
5. When the adhesive reaches the target viscosity, generally from about 30 to about 50 seconds, preferably from about 35 to about 45 seconds, boric acid is added to neutralize a portion of the excess caustic and terminate the swelling reaction.

The term "size" rather than terms such as "diameter" and "length" have been used to describe the fibers present in the carrier phase or the adhesives of the present invention because of the limitations on the analytical techniques which are available to measure the sizes of particles which are dispersed in a liquid. When the particles are viewed with microscopic magnification, they generally appear to be rhombohedral in shape, the length of the fibers being approximately equal to the width. The term "size" therefore refers both to length and width.

In order to measure the size of the fiber particles in the adhesive or carrier phase compositions of the invention, corn fiber was treated with caustic under the same conditions as is used to extract hemicellulose from corn fiber in situ when preparing the carrier phase in accordance with the invention and then the particle size was measured by Particle Data Laboratories, Ltd., 238 North York, Elmhurst, Ill. 60126 U.S.A., using an ELZONE™ particle size analysis. Particle volumes were measured and size was determined by assuming the volumes were for spherical particles and the size (i.e. the diameter) was calculated based on the formula for determining diameter based on the known volume of a sphere. All sizes are expressed in microns. The data generated is set forth in Table 5.

TABLE 5

| Chnl | Size | Volume | Cuml % |
|---|---|---|---|
| 4 | 0.548 | 0 | 100.0 |
| 5 | 0.574 | 2.84E7 | 99.9 |
| 6 | 0.60 | 3.07E7 | 99.7 |
| 7 | 0.629 | 3.31E7 | 99.5 |
| 8 | 0.659 | 3.61E7 | 99.3 |
| 9 | 0.690 | 3.84E7 | 99.0 |
| 10 | 0.722 | 4.01E7 | 98.8 |
| 11 | 0.76 | 4.13E7 | 96.5 |
| 12 | 0.792 | 4.27E7 | 98.3 |
| 13 | 0.829 | 4.30E7 | 96.0 |
| 14 | 0.868 | 4.57E7 | 97.7 |
| 15 | 0.909 | 4.76E7 | 97.4 |
| 16 | 0.95 | 4.96E7 | 97.1 |
| 17 | 0.997 | 5.36E7 | 97.7 |
| 18 | 1.044 | 5.78E7 | 96.4 |
| 19 | 1.093 | 6.03E7 | 96.0 |
| 20 | 1.145 | 6.22E7 | 95.6 |
| 21 | 1.2 | 6.56E7 | 95.2 |
| 22 | 1.255 | 7.00E7 | 94.8 |
| 23 | 1.314 | 7.35E7 | 94.3 |
| 24 | 1.376 | 7.66E7 | 93.8 |
| 25 | 1.441 | 7.94E7 | 93.3 |
| 26 | 1.5 | 8.28E7 | 92.8 |
| 27 | 1.580 | 8.45E7 | 92.2 |
| 28 | 1.655 | 8.52E7 | 91.7 |
| 29 | 1.733 | 8.67E7 | 91.1 |
| 30 | 1.814 | 9.12E7 | 90.6 |
| 31 | 1.9 | 9.12E7 | 90.0 |
| 32 | 1.990 | 9.00E7 | 89.4 |
| 33 | 2.083 | 9.53E7 | 88.8 |
| 34 | 2.181 | 8.52E7 | 88.2 |
| 35 | 2.284 | 8.76E7 | 87.6 |
| 36 | 2.4 | 9.06E7 | 87.1 |
| 37 | 2.505 | 9.15E7 | 86.5 |
| 38 | 2.623 | 9.29E7 | 85.9 |
| 39 | 2.746 | 9.08E7 | 85.3 |
| 40 | 2.876 | 8.47E7 | 84.7 |
| 41 | 3.0 | 7.84E7 | 84.2 |
| 42 | 3.153 | 7.22E7 | 83.7 |
| 43 | 3.302 | 6.77E7 | 83.3 |

TABLE 5-continued

| Chnl | Size | Volume | Cuml % |
|---|---|---|---|
| 44 | 3.457 | 6.37E7 | 82.8 |
| 45 | 3.620 | 6.09E7 | 82.4 |
| 46 | 3.8 | 5.89E7 | 82.0 |
| 47 | 3.970 | 5.85E7 | 81.7 |
| 48 | 4.157 | 6.01E7 | 81.3 |
| 59 | 4.353 | 6.20E7 | 80.9 |
| 50 | 4.558 | 6.42E7 | 80.5 |
| 51 | 4.8 | 6.64E7 | 80.0 |
| 52 | 4.998 | 6.74E7 | 79.6 |
| 53 | 5.233 | 6.97E7 | 79.2 |
| 54 | 5.480 | 7.33E7 | 78.7 |
| 55 | 5.738 | 7.65E7 | 78.2 |
| 56 | 6.0 | 8.18E7 | 77.7 |
| 67 | 6.291 | 8.33E7 | 77.2 |
| 58 | 6.588 | 8.39E7 | 76.6 |
| 69 | 6.898 | 8.81E7 | 76.1 |
| 60 | 7.224 | 9.42E7 | 75.5 |
| 61 | 7.6 | 9.82E7 | 74.9 |
| 62 | 7.921 | 1.02E8 | 74.2 |
| 63 | 8.294 | 1.09E8 | 73.5 |
| 64 | 8.685 | 1.16E8 | 72.8 |
| 65 | 9.094 | 1.21E8 | 72.1 |
| 66 | 9.5 | 1.30E8 | 71.2 |
| 67 | 9.971 | 1.37E8 | 70.4 |
| 68 | 10.44 | 1.45E8 | 69.5 |
| 69 | 10.93 | 1.53E8 | 68.5 |
| 70 | 11.45 | 1.64E8 | 67.5 |
| 71 | 12. | 1.73E8 | 66.4 |
| 72 | 12.55 | 1.82E8 | 65.2 |
| 73 | 13.14 | 1.92E8 | 64.0 |
| 74 | 13.76 | 2.05E8 | 62.8 |
| 75 | 14.41 | 2.16E8 | 61.4 |
| 76 | 15. | 2.26E8 | 60.0 |
| 77 | 15.80 | 2.38E8 | 58.5 |
| 78 | 16.55 | 2.49E8 | 56.9 |
| 79 | 17.33 | 2.57E8 | 55.3 |
| 80 | 18.14 | 2.68E8 | 53.6 |
| 81 | 19. | 2.80E8 | 51.8 |
| 82 | 19.90 | 2.90E8 | 49.9 |
| 83 | 20.83 | 2.95E8 | 48.1 |
| 84 | 21.81 | 3.03E8 | 46.1 |
| 85 | 22.84 | 3.10E8 | 44.1 |
| 86 | 24. | 3.14E8 | 42.1 |
| 87 | 25.05 | 3.15E8 | 40.1 |
| 88 | 26.23 | 3.15E8 | 38.1 |
| 89 | 27.46 | 3.15E8 | 36.0 |
| 90 | 28.76 | 3.14E8 | 34.0 |
| 91 | 30. | 3.07E8 | 32.0 |
| 92 | 31.53 | 2.94E8 | 30.0 |
| 93 | 33.02 | 2.88E8 | 28.2 |
| 94 | 34.57 | 2.91E8 | 26.3 |
| 95 | 36.20 | 2.85E8 | 26.4 |
| 96 | 38. | 2.74E8 | 22.6 |
| 97 | 39.70 | 2.75E8 | 20.8 |
| 98 | 41.57 | 2.79E8 | 19.1 |
| 99 | 43.53 | 2.72E8 | 17.3 |
| 100 | 45.58 | 2.59E8 | 15.6 |
| 101 | 48. | 2.52E8 | 13.9 |
| 102 | 49.96 | 2.43E8 | 12.3 |
| 103 | 52.33 | 2.31E8 | 10.8 |
| 104 | 54.80 | 2.15E8 | 9.34 |
| 105 | 57.38 | 1.92E8 | 8.03 |
| 106 | 60. | 1.75E8 | 6.84 |
| 107 | 62.91 | 1.68E8 | 5.73 |
| 108 | 65.88 | 1.52E8 | 4.70 |
| 109 | 68.98 | 1.33E8 | 3.78 |
| 110 | 72.24 | 1.09E8 | 3.00 |
| 111 | 76. | 9.32E7 | 2.34 |
| 112 | 79.21 | 7.95E7 | 1.78 |
| 113 | 82.94 | 6.41E7 | 1.32 |
| 114 | 86.85 | 5.04E7 | 0.95 |
| 115 | 90.94 | 3.59E7 | 0.67 |
| 116 | 95. | 2.88E7 | 0.46 |
| 117 | 99.71 | 1.83E7 | 0.31 |
| 118 | 104.4 | 1.31E7 | 0.21 |
| 119 | 109.3 | 9865569 | 0.13 |
| 120 | 114.5 | 7681644 | 0.06 |
| 121 | 120. | 6392795 | 0.03 |
| 122 | 125.5 | 1575967 | 0.01 |
| 123 | 131.4 | 0 | 0.00 |

Having set forth the general nature and some specific examples of the present invention, the scope of the invention is now more specifically set forth in the appended claims.

What is claimed is:

1. A method of making corrugated board comprising joining a corrugated medium to at least one liner using a corrugating adhesive composition which in an aqueous emulsion comprises water; from about 10 to about 35 parts per 100 parts of adhesive of a carbohydrate component comprised of unmodified starch and/or modified starch and/or dextrin, and wherein from about 2 to about 6 parts per 100 parts of adhesive of the carbohydrate component is in a carrier phase; from about 0.1 to about 20% by weight hemicellulose based on total carbohydrate wherein the hemicellulose has been extracted from corn fiber in situ in preparing the carrier phase; from about 0.2 to about 1 part per 100 parts of adhesive of boron containing compound and sufficient caustic to attain a pH from about 10 to about 14, wherein the corn fiber in the adhesive has a geometric mean size of less than about 0.00005 inch and a median size of less than about 0.00005 inch.

2. The method of claim 1 wherein the corn fiber is dietary corn fiber comprising from about 50% to about 80% hemicellulose.

3. A corrugating adhesive composition of the carrier or carrier-no-carrier type which in an aqueous emulsion comprises water; from about 10 to about 35 parts per 100 parts of adhesive of a carbohydrate component comprised of unmodified starch and/or modified starch and/or dextrin, wherein from about 2 to about 6 parts per 100 parts of adhesive of the carbohydrate component is in a carrier phase; from about 0.2 to about 1 part per 100 parts of adhesive of a boron containing compound; from about 0.1 to about 20.0% hemicellulose by weight based on total carbohydrate; and sufficient caustic to attain a pH from about 10 to about 14, wherein the hemicellulose has been extracted from corn fiber in situ in preparing the carrier phase and the corn fiber in the carrier phase has a geometric mean size of less than about 0.00005 inch and a median size of less than about 0.00005 inch.

4. The composition of claim 3 wherein the carbohydrate component is present in an amount from about 18 to about 32 parts per 100 parts of adhesive.

5. The composition of claim 3 having a suspended phase comprised of from about 10 to about 25 parts per 100 parts of adhesive of the carbohydrate component.

6. The composition of claim 3 further comprising a waterproofing or water resistant resin in an amount of from about 0.5 to about 5 parts per 100 of adhesive.

7. The composition of claim 3 wherein the hemicellulose is partially hydrolyzed.

8. The composition of claim 3 wherein the corn fiber is dietary corn fiber comprising from about 50% to about 80% hemicellulose.

9. A method of making a carrier phase composition for use in a carrier type or a carrier-no-carrier type corrugating adhesive composition which comprises the following sequential steps with continuous mixing:

a) admixing a carbohydrate component comprised of unmodified starch and/or modified starch and/or dextrin with water and corn fiber in a primary mixer and heating for at least about 1 minute at a temperature of from about 46° C. to about 82° C.;

b) admixing an aqueous solution of caustic to attain a pH from about 10 to about 14 and continuing mixing;

c) admixing additional water; and d) admixing from about 0.03 to about 1 part per 100 parts of carrier phase of a boron containing compound, wherein the corn fiber in the carrier phase has a geometric mean size of less than about 0.00005 inch and a median size of less than about 0.00005 inch.

10. A method of making a carrier type corrugating adhesive composition which comprises:

a) preparing a carrier phase by the following sequential steps with continuous mixing admixing a carbohydrate component comprised of unmodified starch and/or modified starch and/or dextrin with water and corn fiber in a primary mixer and heating for at least about 1 minute at a temperature from about 46° C. to about 82° C.;

admixing an aqueous solution of caustic to attain a pH from about 10 to about 14 and;

admixing additional water;

b) preparing a suspended phase by the following sequential steps with continuous mixing charging a secondary mixer with water and heating the water to a temperature from about 21° C. to about 41° C.; and admixing with the heated water a carbohydrate component;

c) with continuous mixing, gradually admixing the contents of the primary mixer with the contents of the secondary mixer, wherein a boron containing compound is admixed with the carrier phase, the suspended phase or both the carrier phase and the suspended phase and the total amount of boron containing compound added is from about 0.2 to about 1 part per 100 parts of adhesive, and the corn fiber in the carrier phase has a geometric mean size of less than about 0.00005 inch and a median size of less than about 0.00005 inch.

* * * * *